Patented Oct. 15, 1940

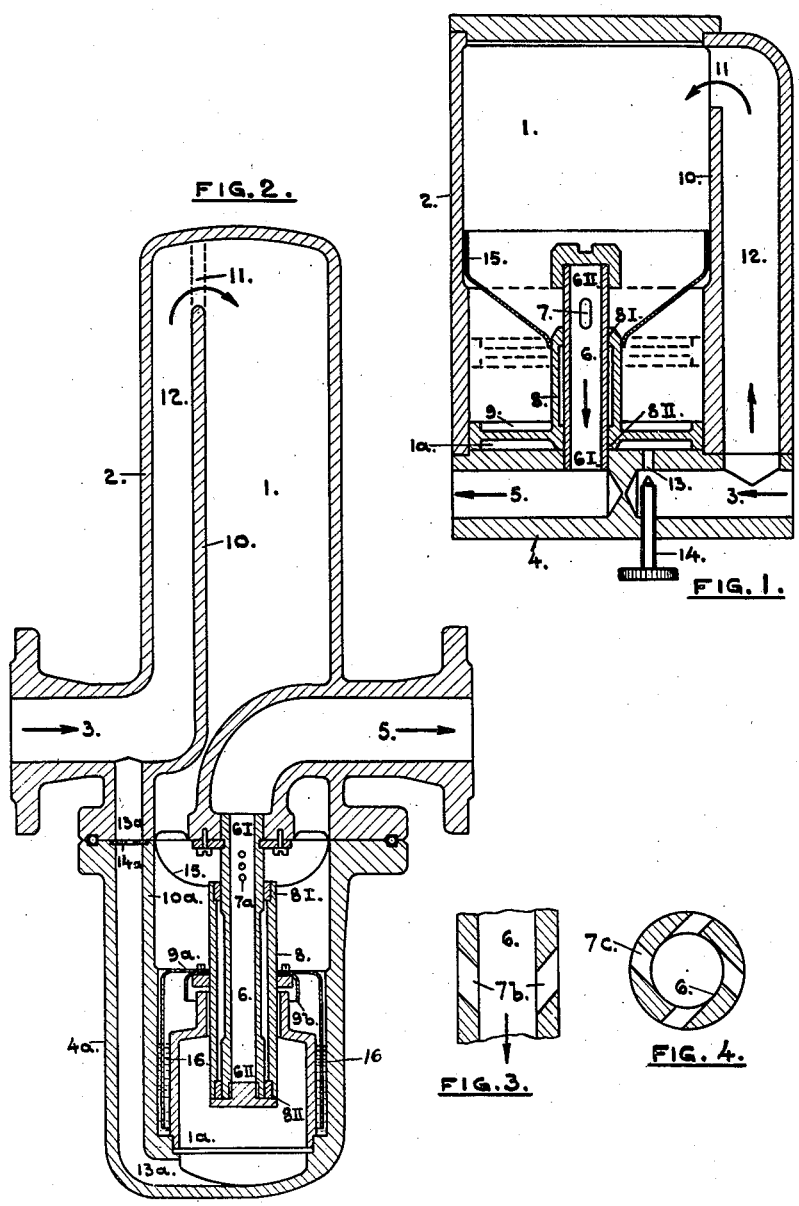

2,218,152

UNITED STATES PATENT OFFICE 2,218,152

DRAINING DEVICE

Ake Birger Ljungström, Stockholm, Sweden, assignor, by mesne assignments, to American Heat Reclaiming Corporation, New York, N. Y., a corporation of New York Application May 18, 1938, Serial No. 208,678
In Sweden May 18, 1937

21 Claims. (Cl. 137—103)

This invention relates to devices for draining purposes, such as for instance used at steam-heated apparatus for discharging the condensates formed, automatically in accordance with the supply thereof, while completely preventing the escape of steam at all pressures, or for similar services, and more particularly to this kind of devices having a vertical condensate chamber enclosed in a housing and provided with a draining valve being operated as desired in dependence on the level of liquid herein by an actuating piston or the like which is daily balanced with respect to the steam pressure.

In such devices it was herebefore preferred to use a draining valve of the piston type comprising a control piston adapted to slide in a suitable sleeve member with axially extending out-let slots being thus opened or closed by the control piston as determined by an actuating piston which may either be fitted closely in a corresponding cylindrical part of the condensate chamber or consist of a bell moving in a liquid-seal without contacting with the surrounding chamber wall and instead guided by special means. Anyway, this construction requires at different places in the housing two or more separate fittings for the movable parts which fittings are depending on each other, and thereby the apparatus will be rather expensive to manufacture, but besides there is needed comparably great actuating forces to operate the same wherefor it must also in a sense be a great deal oversized so as to compensate the lack of sensibility relative to the ideal.

Another serious drawback in the devices referred to is that their draining capacity is apt to be lowered and disturbances may often be caused in the smooth operation of the same on account of the fact that the condensate flow changes its direction nearly at right angles when discharged through the sleeve openings and the result of this is a varying dynamic drop of pressure in the narrowed passageway formed by the sleeve member so that the control piston will be subjected to a very irregular throttling effect which is counteracting the prevailing opening tendency.

The chief object of this inventon is to eliminate the above-mentioned drawbacks and provide a more sensible and reliable but less expensive apparatus of a similar character.

One object of the invention is to make the draining valve in this kind of devices as a slide valve having the discharge openings disposed in such a place that the flow of condensate will not interfere with the movements of the valve controlling means.

A further object of the invention is to use a special partition arrangement in the condensate chamber for protecting the actuating member from the dynamic forces caused by the flow of condensate and possibly also guiding the flow straight into the discharge openings.

A further object of the invention is to simplify this device by making the valve controlling means as a single unit.

A further object of the invention is to construct the device so that only one single fitting is required for guiding its movable parts.

Other objects will be evident from the following specification and claims.

By way of example some preferred embodiments of the invention are illustrated on the annexed drawing in which Figs. 1 and 2 show both a vertical section through different embodiments, Figs. 3 and 4 show, of a larger scale, resp. an axial section and a cross section through the discharge means according to the invention.

Referring now to the device shown by Fig. 1 on the drawing the vertical condensate chamber proper is indicated by 1 and located in a closed housing formed by a substantially cylindrical casing 2 which may have a removable upper cover, while the inlet opening 3 for condensate is located in a bottom plate 4 whereby the lower end of the casing is closed. In the bottom plate 4 there is also an out-let channel 5 for condensate and naturally both this out-let and the in-let may be connected to any pipe system. Centrally in the bottom plate opens the straight discharge tube 6 to the inner part of the out-let channel 5 with the end 6I which is tightly secured in the bottom plate, while the other tube end 6II projects vertically some distance into the condensate chamber and is normally kept closed, for instance by a cap or the like as shown, in such a manner that it can readily be opened. The discharge tube has in the upper part of its wall near its closed end 6II one or more draining openings 7 which suitably consist of axially extending slots being preferably provided in pairs at places located diametrically opposite each other.

Enclosing the discharge tube 6 there is fitted on the same a rather long valve slide 8 which is provided with comparatively short guiding- and sealing surfaces 8I and 8II near both its ends and is thus easily movable over the tube surface. In the lowermost position of the valve slide its lower edge 8II is resting against the bottom plate 4 and then the draining openings 7 in the discharge tube 6 are laid entirely free towards the condensate chamber, while they are completely covered by the regulating slide edge 8I when moved to its top position which in this case is determined by the tube cap.

According to this embodiment the valve slide 8 is combined with the actuating piston to a single unit inasmuch as the lower part of the slide is enlarged to such a piston 9 which is concentric with the discharge tube 6 and closely fitted in the lower part of the condensate chamber so as to be vertically movable therein and hereby guided by the chamber wall. Thus, the piston 9 separates the condensate chamber proper 1 from a lower pressure chamber 1a at the bottom of the device, and further the common side wall consists partly of a partition 10 in the housing wherein there is an over-flow opening 11 for passing condensate into the condensate chamber proper at the top thereof. To this over-flow 11 the condensate arrives through a vertical intake- and pressure channel 12 which is formed between the partition 11 and the outer wall of the casing and communicates in the first place with the condensate in-let 3 and via the same in the second place also with the pressure chamber 1a through a throttled opening 13. The latter is made narrow in relation to the cross-sectional area of the channel 12 in order that the liquid in the pressure chamber 1a may exert a stabilizing effect on the movements of the actuating piston and conveniently the area of this opening 13 may be adjustable for which purpose there may be provided a needle valve 14, for instance.

In accordance with the invention the actuating piston 9 may be arranged to move so far from the draining openings 7 in the discharge tube 6 that it will hardly at all be affected by the flow of condensate in the device or any undesired variation in pressure caused thereby, and besides the path of flow will become nearly straight, with the result that a dynamic drop of pressure is practically avoided. But in order to protect the actuating piston 9 still more effectively from such dangerous influences or alternately instead of the first-mentioned arrangement there may also be inserted a suitable plate partition in the condensate chamber proper so as to separate its discharge section from the space in which the piston is moving. As shown in Fig. 1 there can be used a funnel-like guiding plate 15 for this purpose which plate may conveniently be fixed on the valve slide 8 and shaped as as to guide the down-flowing stream of condensate straight into the draining openings, while moving with its upper edge adjacent to the chamber, the play therebetween being preferably rather small. Thus, in the last-mentioned case the actuating piston 9 may very well be located in the neighborhood of the regulating edge 8II of the valve slide, as shown in the same figure by dotted lines.

The device described herewith acts substantially as follows:

During normal operating conditions the pressure chamber 1a as well as the pressure channel 12 are both completely filled with condensate and then the constant liquid column in the latter will exert a static pressure on the bottom side of the actuating piston 9 which pressure is directed upwards and practically constant. Under influence of this pressure alone, the actuating piston will rise and lift the valve slide 8 to its top position and thereby keep the draining openings 7 closed, thus preventing steam to escape through the same and the discharge tube 6 at all times, when the supply of condensate is interrupted or possibly too small to cause a reverse action. However, any surplus of condensate to be discharged will arrive into the condensate chamber proper through the overflow opening 11 and is collected therein, until it has reached a certain level of equilibrium whereat the liquid column formed hereby is exerting a sufficient downwardly directed static pressure on the top side of the actuating piston to just about counterbalance the first-mentioned closing pressure. Consequently, whenever the supply of condensate is large enough to cause the level of liquid in the condensate chamber to exceed this equilibrium ever so little, there will be a superpressure prevailing in the same which has a tendency to press the actuating piston downwards and thus more or less uncover the draining openings so as to effect discharging of the condensate as required, but inversely the draining valve is shut off again, as soon as the liquid level has sunk back in response to decrease in the supply of condensate. It is obvious that the position of the valve slide will be dependent on the liquid level in the condensate chamber proper, whereas this level again will adjust itself in accordance with the supply of condensate in such a manner that the draining capacity always corresponds to the same, and this is attained thereby that the actuating piston is effected only by the static liquid pressures, as explained, while it is balanced with respect to the steam pressure.

The same manner of action characterises also the embodiment shown in Fig. 2, though this device is constructed somewhat differently. As to the housing it has both the in-let and the out-let openings, 3 and 5 respectively, in an upper casing 2 above the draining and control means which are arranged in a lower casing 4a whereby the bottom plate is replaced and wherein also the pressure chamber 1a is located. From the condensate in-let 3 to the bottom of the pressure chamber 1a extends a communication channel 13a which is narrow compared with the cross sectional area at the in-let and in which there may in addition also be inserted a throttle member 14a, preferably so as to be exchangeable. The discharge tube 6 is connected with its upper or out-let end 6I to an enlarged passageway which projects into the condensate chamber from the out-let opening 5 for condensate, and downwards into the pressure chamber goes a solid or hollow extension of the discharge tube ending with the closed bottom part 6II and serving as guiding means for a valve slide. Near the out-let end 6I and thus on the same side of the actuating piston are the draining openings 7 in the discharge tube located, which openings may be covered or laid free by the cooperating valve slide 8 according to the position taken by the same in response to the movements of the actuating piston 9a. In this case the latter has the shape of a bell which is interconnected with the valve slide at a suitable distance from the regulating upper slide edge 8I so as to enclose the slide and the tube extension concentrically, while being open towards the pressure chamber 1a and movable in the lower part of the condensate chamber proper, with its side wall adjacent to the chamber wall, though therebetween is a comparatively wide play. In order to effect a tight sealing between the condensate chamber proper and the pressure chamber 1a it is arranged an annular liquid seal 16 round their common inner wall which liquid seal may be fitted with mercury, for instance, and in which the lower wall edge of the bell will always be dipping. Further, with the object of preventing the sealing liquid to be splashed out the annular pocket for the same may conveniently have its inner wall shaped so as to form a collar-like upper extension which closely encircles the valve slide 8 and thereby serves as a protection, being possibly made still more effective by using an additional bell member 9b carried by the actuating bell at its inside and enclosing the collar part mentioned. If desired, there may also in this case be inserted a damping partition in the condensate chamber, for instance as shown, in the form of a funnel-shaped plate 15 which is secured at its outer edge to the chamber wall and has a central opening for the discharge valve, requiring that the regulating edge 8I of the valve slide should be removed from the actuating piston at least by a distance corresponding to the length of the slide and piston stroke.

It should be observed that according to this embodiment there is only needed one single fitting and besides this device is particularly well adapted for taking care of a considerable varying load, being even under such conditions very resistant and reliable in operation.

Obviously, many details of the device can be modified in different manners within the scope of the invention.

On the drawing, however, there is only shown a few modifications referring chiefly to the discharge valve. Thus, the guiding surfaces of the valve slide 8 may consist either, as in Fig. 1, of bores in the slide or of bushes inserted in the same, as in Fig. 2. Conveniently, the regulating edge 8I of the valve slide should be made as thin as possible and to this end it might be slanting. Further, the slot-shaped draining openings 7 in the discharge tube 6 according to Fig. 1 may be replaced by rows of circular holes, as shown in Fig. 2. Finally, the direction of the draining openings may be varied, so as eventually to deviate from the radial direction, namely, either obliquely towards the out-let end, as illustrated by 7b in Fig. 3, and/or tangentially of the tube axis in accordance with 7c in Fig. 4.

Among other possibilities of changing the construction it should here be noted that the discharge tube which may well be curved at some place inside the housing, may extend through two sides of the same and thereby made accessible for cleaning from the outside. Another conceivable and quite useful modification of this type of dischargers is to arrange the discharge valve with its controlling means horizontally in which case the other parts of the apparatus have to be changed as required hereby.

Still other details as well as the principal features of the type of apparatus which is the subject matter of the present improvements, are previously disclosed in the specification of U. S. Patent No. 1,977,921.

It is to be understood that the scope of this invention is not limited otherwise than clearly expressed in the appended claims.

What I claim is:

1. A liquid trap for vapor lines including in combination, a vertically disposed condensate chamber having a condensate inlet at its top and a discharge valve at its bottom, means for controlling the operation of said valve, a substantially closed pressure chamber extending from the bottom part of said condensate chamber and communicating therewith solely through said inlet, said valve controlling means including a movable partition between said condensate chamber and said pressure chamber, sealing means associated with said movable partition and cooperating therewith to effectively separate said chambers, said discharge valve comprising a sliding valve element mounted on a discharge tube which projects into the condensate chamber, the projecting portion of said tube being formed with a lateral draining opening, said slide valve element being associated with and adapted to control said draining opening, the construction described involving the location of the draining opening relative to the valve control means in a manner such that the latter will be substantially unaffected by the flow of liquid to the draining opening or variations in dynamic pressure inherent in such flow.

2. The structure recited in claim 1, said draining opening in the said discharge tube being relatively remote from the control means for the said valve in order that the flow of liquid to the draining opening shall not substantially affect the said control means.

3. A liquid trap as set forth in claim 1, including a wall structure arranged in said condensate chamber in a manner to form a partition about and surrounding the discharge tube between the space in which the draining opening is located and the space in which the valve control means is adapted to move, said partition being further arranged to provide for and not exclude communication between said spaces though substantially supporting the same, said wall structure being adapted to prevent the appreciable affecting of the valve actuating member by the flow of condensate to the draining opening.

4. The structure recited in claim 1, a plate member secured to the inner wall of the condensate chamber to form a partition surrounding the discharge tube between the draining opening therein and the valve control means, the spaces on each side of said plate partition member being substantially separated, a hole in said plate forming a communication with said spaces, said discharge tube and said slide valve element extending through said hole, whereby the flow of condensate to the draining opening will not appreciably affect the proper operation of the valve control means.

5. A liquid trap as set forth in claim 1, said structure including a funnel-like condensate guide plate secured to said valve control means in a manner to form a movable partition surrounding the discharge tube between the space in which the draining opening is located and the space in which the valve control means is adapted to move, said guide plate extending from that part of the valve control means adjacent the draining opening to adjacent the inner wall of the condensate chamber above the draining opening in a manner whereby the flow of condensate will be guided towards the draining opening and the said spaces will be substantially separated though still communicating in order that the flow of condensate to the draining opening will not appreciably interfere with the operation of the valve control means.

6. The structure recited in claim 1, said draining opening located in said discharge tube having an oblique axis extending toward the outlet of the said discharge tube.

7. The structure recited in claim 1, said draining opening located in said discharge tube extending substantially tangentially from the inner wall of said tube.

8. The structure recited in claim 1, said discharge tube projecting into said condensate chamber for a predetermined distance, said projecting portion having a closure for its end within said condensate chamber.

9. The structure recited in claim 1, said discharge tube having an additional portion located within said pressure chamber, said additional portion having an outlet, said outlet and said draining opening being located on different sides of said valve control means.

10. The structure recited in claim 1, said discharge tube having a portion within the said condensate chamber and having an outlet, said discharge tube having its opposite end extending into the said pressure chamber and being closed at its end in said pressure chamber, said outlet end and said draining opening being disposed on one side of said valve control means.

11. The structure recited in claim 1, said slide valve element having inwardly projecting guiding and sealing surfaces of relatively short length in an axial direction and being spaced at a relatively great distance from each other also in an axial direction, said guiding and sealing surfaces arranged to fit closely on and about said discharge tube.

12. The structure recited in claim 1, said slide valve element being relatively long and having inwardly projecting guiding and sealing surfaces arranged only at opposite ends of said valve slide element, said guiding and sealing surfaces being adapted to fit closely on and about the exterior of said discharge tube.

13. The structure recited in claim 1, said slide valve element having an edge cooperating with and controlling the draining opening in the discharge tube.

14. The structure recited in claim 1, said valve control means comprising a piston closely fitted in sealing yet slidable relation with the walls of said chambers.

15. The structure recited in claim 1, said valve control means comprising a bell arranged for vertical movement, a liquid seal, at least a portion of said bell dipping in said liquid seal whereby the chambers formed on opposite sides of said bell are effectively separated.

16. The structure recited in claim 1, said communication between said pressure chamber and said condensate inlet including a part for introducing liquid into the pressure chamber, and a throttling means in said part.

17. The structure recited in claim 1, said communicating means between said pressure chamber and said condensate inlet having a part for introducing liquid into said pressure chamber, a throttling means in said part, said throttling means comprising a restriction in the walls of said communicating means, said restriction comprising an opening which is relatively small as compared with the cross-sectional area of said communicating means.

18. The structure recited in claim 1, said communicating means between said pressure chamber and the condensate inlet including a part for introducing liquid into the pressure chamber and a throttling means in said part, said throttling means being adjustable whereby the throttling effect may be varied as desired.

19. The structure recited in claim 1, the communicating means between the pressure chamber and the condensate inlet having a part for introducing liquid into the pressure chamber, throttling means in said part, said throttling means comprising a disc formed with an opening, said throttling disc being readily removable from said part.

20. The structure recited in claim 1, means for introducing liquid into the pressure chamber through the communicating means between the pressure chamber and the condensate inlet, said last mentioned means including an adjustable valve for throttling the flow therethrough.

21. The structure recited in claim 1, means for introducing liquid into the pressure chamber through the communicating means between the pressure chamber and the condensate inlet, throttling means in said introducing means, said throttling means comprising an opening, valve means for controlling said opening, means located exteriorly of said trap for controlling said valve.

AKE BIRGER LJUNGSTRÖM.